Aug. 15, 1961

W. W. HOFFMANN 2,996,241

RESETTABLE COUNTER WHEEL UNITS

Filed Sept. 27, 1957

INVENTOR.

Walter W. HOFFMANN

BY *John W. Michael*

ATTORNEY

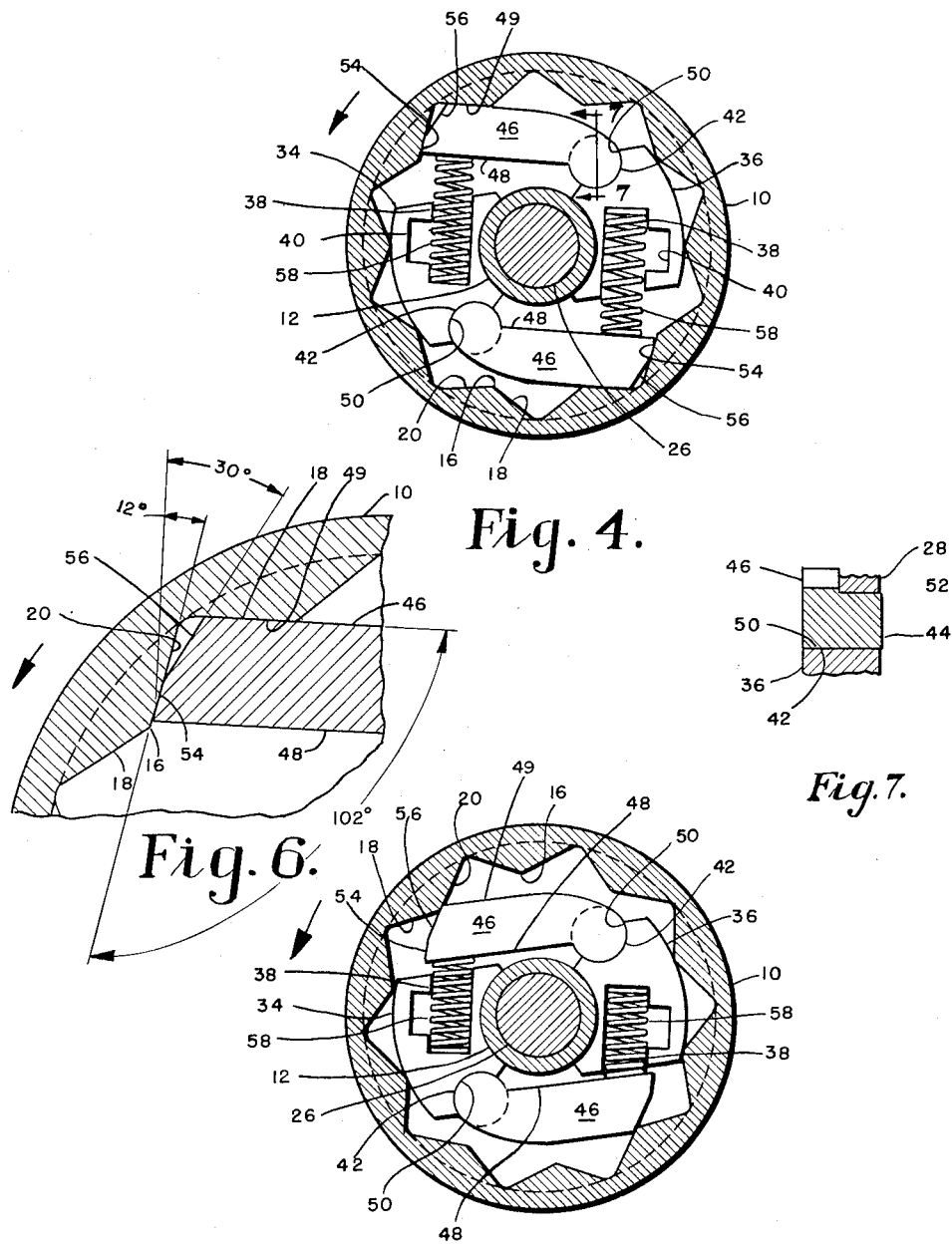

United States Patent Office 2,996,241
Patented Aug. 15, 1961

2,996,241
RESETTABLE COUNTER WHEEL UNITS
Walter W. Hoffmann, Waukesha County, Wis., assignor to Durant Manufacturing Co., Milwaukee, Wis., a corporation of Wisconsin
Filed Sept. 27, 1957, Ser. No. 686,656
1 Claim. (Cl. 235—1)

This invention relates to improvements in resettable counter wheel units.

In such units a number wheel with internal ratchet teeth is driven by a gear wheel through pawls which cooperate with the ratchet teeth. The unit is mounted on a reset shaft which coacts with a reset pawl on the number wheel to turn the number wheel to zero. The pawls and ratchet teeth permit this to take place without rotation of the gear wheel. However, it is essential upon resetting to positively locate the number wheel so that its zero is properly aligned with the sight opening and with the zero of other counter wheel units in a counter.

It is an object of this invention, therefore, to provide a counter wheel unit having such a feature and which is characterized by simplicity in construction, economy of manufacture, care of assembly and efficiency of operation.

In obtaining this object drive pawls are pivotally mounted on the gear wheel. These pawls have specially shaped ends with an angulation relative to that of the sides of the internal ratchet teeth so that it is impossible to hang up the number wheel on the peaks of the ratchet teeth. Coiled compression springs acting at the ends of the drive pawls, with the direction of their force substantially aligned with receding sides of the ratchet teeth cause such pawls to either return the number wheel to previous position or advance the number wheel to the next position and seat the pawls at the bottom of the ratchet teeth to positively locate the number wheel with respect to the gear wheel (held in place).

Other objects and advantages are apparent from a detailed description of this invention when read in connection with the accompanying drawings in which:

FIG. 4 is a sectional view similar to the view of FIG. 2 with the retainer plate removed and illustrating the position of the pawl with respect to the ratchet teeth when the number wheel is in a positive location with respect to the gear wheel;

FIG. 5 is a sectional view similar to FIG. 4 showing the relative position of the pawls and internal ratchet teeth after the number wheel has been partially rotated toward reset position and the pawls have passed over the peaks of the ratchet teeth;

FIG. 6 is a fragmentary enlarged sectional view showing in detail the angles of the sides of the ratchet teeth and the ends of the pawls relative to the sides of the pawls; and FIG. 7 is a fragmentary sectional view taken on the line 7—7 of FIG. 4.

Figure 1:
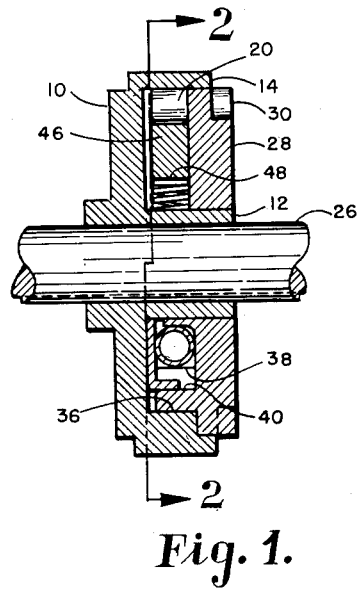
FIG. 1 is a sectional view of a counter wheel unit embodying the present invention taken along the line 1—1 of FIG. 2.

Referring to the drawings by reference numerals, the resettable counter wheel unit has a number wheel 10 of molded plastic including an internal hub 12 and an external flange 14. On the outsides of this flange are consecutively spaced numerals running from "0" to "9." On the inner side of the flange are ten equally spaced internal V-shaped ratchet teeth 16. Each tooth has an advancing side 18 and a receding side 20 meeting at a peak line. As can be readily seen in FIG. 6, there is an angle of substantially 102 degrees between the receding face 20 of one tooth and the advancing face 18 of an adjacent tooth. The number wheel carries in the usual fashion a reset pawl 22 urged into operative position by a spring 24. The number wheel is rotatively mounted on a reset shaft 26 which has a shoulder (not shown) for engaging the end of the pawl 22 when the shaft is rotated in reset direction to move the number wheel in the direction indicated by the arrows.

A molded plastic gear wheel 28 with a central bearing 32 rotatably riding on the hub 12 has a circular part within the flange 14. Extending from this part beyond such flange are twenty peripheral teeth 30 which are engaged by a transfer pinion (not shown). On the inner face of the gear wheel 28 are two diametrically opposed pads 34 and 36 formed integral therewith. The outer edges of these pads fit within the circle formed by the peaks of the teeth 18. Each of the pads has a spring receiving recess 38, a pawl pivot bearing surface 42, and a locking notch 40. Each gear wheel has a pawl pivot bearing 44 concentric with the bearing surface 42.

Figure 2:
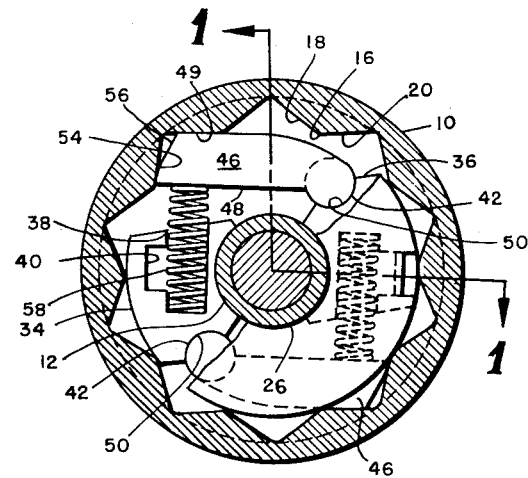
FIG. 2 is a sectional view taken on the line 2—2 of FIG. 1.
Figure 3:
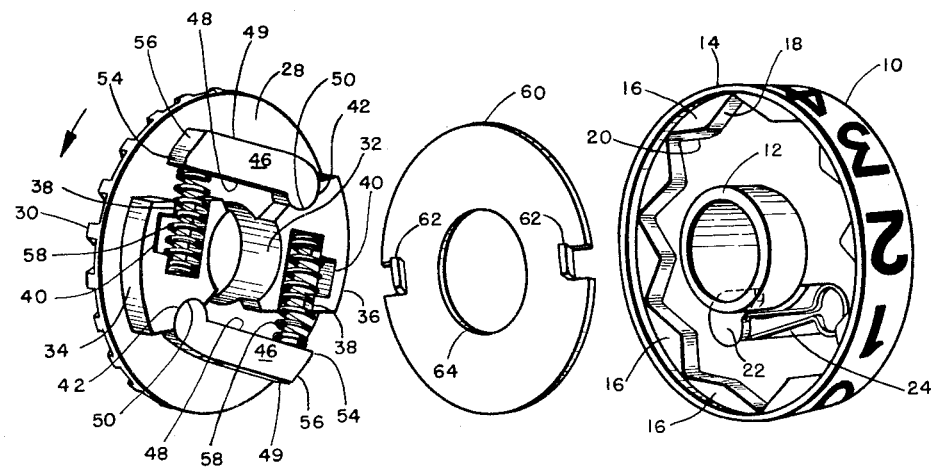
FIG. 3 is an exploded view in perspective of the gear wheel and pawl assembly, the retaining plate and the number wheel.

Driving pawls 46 are pivotally mounted on the inner face of the gear wheel 28 adjacent the pads 34 and 36. At one end of each pawl there is a circular bearing 50 which projects laterally from the pawl to form an integral pivot 52. As shown in FIG. 7, the pivot 52 is rotatably engaged in the bearing 44, and the circular bearing 50 engages the bearing 44 to provide large bearing surfaces for the pawl preventing any canting and consequential locking during pivotal motion. At the other or unsupported end of each pawl are two angularly related plane surfaces. As is clearly shown in FIG. 6, a short pushing surface 54 is angled inwardly approximately 12 degrees and a long or sliding surface 56 is angled inwardly approximately 30 degrees from a plane normal to the outer side 49. As the receding side 20 of one tooth is at an angle of 102 degrees with respect to the advancing side 20 of the adjacent tooth, the pawl when seated as shown in FIGS. 2, 4 and 6 will have its pushing surface 54 resting flatly against the receding side 20 and its outer side 49 resting flatly against the advancing side 18 of the next adjacent tooth. This stabilizes the pawl with respect to the gear wheel in the driving action. Each of the pawls 46 is urged radially outwardly toward and into such seated position by a coiled compression spring 58. The springs are partially contained in and guided by the spring recesses 38. The force of such spring is exerted on the pawl at its outer end in a direction substantially normal to the inner face 48. The advantage of this is that such force acts on an advancing side 20 at an angle which easily causes the number wheel to be moved reversedly with respect to the gear wheel until the pushing surface 54 seats firmly on the receding side 18. Thus a positively located position of the number wheel is attained.

A metal retaining plate 60 with a central opening 64 for the hub 12 has extending lugs 62 which frictionally engage the notches 40 to hold the retaining plate 60 in place against the outer faces of the pads 34 and 36. It thus holds the pawls 46 and springs 58 in place making a sub-assembly.

As previously stated, one essential feature of this invention is the preventing of the hanging up of the number wheel at a point intermediate two adjacent fully seated positions. Since the long or sliding portion 56 of a pawl is at an angle of approximately 30 degrees from the plane normal to the outer face 49, such sliding portion forms with the outer side 49 a peak line and an included angle of about 120 degrees (90°+30°). This compares with an angle of approximately 138 degrees between the sides of a tooth 16. To reset, the number wheel is moved by the reset shaft 26 through the reset pawl 22 in the direction of the arrows. The gear wheel 28, being held by the transfer pinion, does not move. Hence, the pawls 46 are moved inwardly from the positions shown in FIGS. 2, 4 and 6 toward the position shown in FIG. 5 compressing the springs 58. If the resetting force on the reset shaft 26 be released at any time before the peak lines of the teeth 16 pass the peak lines of the pawls (between portions 56 and outer faces 49), the force in the springs 58 will cause the pawls to reverse the direction of rotation of the number wheel 10 until the pawls again seat as shown in the positions of FIGS. 2, 4 and 6. However, as soon as such peak lines come into alignment, the springs will force the pawls outwardly and the sliding portions 56 will come into contact with the peak line of the tooth 16 and cam the tooth in a counterclockwise direction to force the number wheel 10 farther ahead in the direction of the arrows. This will occur even though there be no further resetting movement of the reset shaft 26. The pawls, as heretofore described, positively seat between the next set of teeth and place the number wheel 10 with a number accurately positioned relative to the gear wheel 28. It takes about three-fourths of the total angular reset movement of the number wheel between adjacent seated positions to bring the peak lines of teeth and pawls into alignment. This substantially compresses the springs 58 causing considerable energy to be stored therein. The force exerted by the spring 58 has one component which acts perpendicular to a radius passing through the centers of the pivots of the pawls and the peak lines of the pawls. The reactive components at the peak lines of the teeth act radially inwardly toward the center of the reset shaft 26. The centers of the pivots of the pawls are offset as shown from the center of such reset shaft. Hence, when the peak lines of the pawls and teeth are in alignment their components are not equal and opposite components which can be the cause of hanging up the number wheel between seated positions. Another component of the force exerted by the springs 58 acts substantially normal to the plane of the faces 56. When these are contacted by the peak lines of the teeth 16 the resultant of both components, due to the offset positioning of the pivots of the pawls and the fact that the first mentioned component is greater, acts to the right (counterclockwise) of the radial lines joining the peak lines of the teeth and the center of shaft 26. This cams the teeth in a counterclockwise direction as heretofore explained.

Although but one embodiment of the invention is shown and described herein, it will be understood that other embodiments and applications thereof will come within the spirit of the invention and the scope of the appended claim.

I claim:

In a resettable counter wheel unit having a number wheel and a gear wheel concentrically related, internal ratchet teeth on one of said wheels, each of said internal ratchet teeth having an advancing side and a receding side meeting in a peak line, a pawl pivoted to the other of said wheels and movable outwardly to engage with said ratchet teeth, said pawl having an inner face adjacent the free end thereof, said pawl having a pushing surface and a sliding surface on its outer end, said pushing surface resting flatly on the side of one of said ratchet teeth when said pawl is fully seated, a spring recess on said last mentioned wheel, and a coiled compression spring acting between said spring recess and said inner face, the force of said spring being exerted in a direction substantially normal to said inner face, said coiled compression spring having its longitudinal axis substantially aligned with the receding side of a tooth as said sliding surface comes into contact with said peak line.

References Cited in the file of this patent

UNITED STATES PATENTS

| | | |
|---|---|---|
| 1,592,568 | Orth | July 13, 1926 |
| 2,137,013 | Bradley | Nov. 15, 1938 |
| 2,342,325 | Bliss | Feb. 22, 1944 |
| 2,920,816 | Greenhow | Jan. 12, 1960 |